United States Patent
Smith

(10) Patent No.: US 6,653,820 B1
(45) Date of Patent: Nov. 25, 2003

(54) APPARATUS AND METHOD FOR PROTECTING A BATTERY CELL FROM OVERCHARGING

(75) Inventor: Gregory J. Smith, Tucson, AZ (US)

(73) Assignee: National Semiconductor Corporation, Santa Clara, CA (US)

(*) Notice: Subject to any disclaimer, the term of this patent is extended or adjusted under 35 U.S.C. 154(b) by 135 days.

(21) Appl. No.: 10/062,883

(22) Filed: Jan. 30, 2002

(51) Int. Cl.[7] ............................................. H01M 10/046
(52) U.S. Cl. ...................................... 320/134; 320/136
(58) Field of Search ................................ 320/134, 136, 320/125, 128, 152, 157, 156, 162, 164, 138; 361/78, 79, 92, 93.1; 323/226, 223, 273, 281, 303

(56) References Cited

U.S. PATENT DOCUMENTS

| | | | |
|---|---|---|---|
| 5,471,128 A | 11/1995 | Patino et al. | 320/128 |
| 5,504,411 A | 4/1996 | McCaleb et al. | 320/150 |
| 5,546,264 A | 8/1996 | Williamson et al. | 361/84 |
| 5,767,659 A | 6/1998 | Farley | 320/106 |
| 5,982,149 A | 11/1999 | Shih | 320/134 |
| 6,154,081 A | 11/2000 | Pakkala et al. | 327/309 |
| 6,504,347 B1 * | 1/2003 | Smith et al. | 323/226 |
| 6,586,911 B1 * | 7/2003 | Smith et al. | 320/134 |
| 6,586,917 B1 * | 7/2003 | Smith | 323/280 |

* cited by examiner

Primary Examiner—Pia Tibbits
(74) Attorney, Agent, or Firm—Brett A. Hertzberg; Merchant & Gould

(57) ABSTRACT

A shunt regulator system includes protection to prevent a battery from overcharging. The system may be implemented in an integrated circuit. A control circuit is used to actuate one or more switches when one or more fault conditions are detected. The switches provide a conduction path to shunt current away from the battery such that the battery does not charge beyond a safe level. The control circuit may include a comparator that compares the battery voltage to a predetermined level, which may be adjusted based on various system requirements. A fault condition may result from defects and/or misuse, including: semiconductor processing defects such as a shorted resistor, manufacturing assembly defects such as improperly connected or defective components, utilizing a non-compliant charger, as well as others. The control circuit and the switches prevent the battery from being overcharged when one or more fault conditions occur.

22 Claims, 3 Drawing Sheets

APPARATUS AND METHOD FOR PROTECTING A BATTERY CELL FROM OVERCHARGING

FIELD OF THE INVENTION

The present invention is related to charger circuits for battery cells. More particularly, the present invention is related to a protection circuit that prevents excessive charging of a battery cell when a fault is present in the charger system.

BACKGROUND OF THE INVENTION

Rechargeable lithium bases batteries, including Lithium-Ion batteries and Lithium-Polymer batteries, are used in portable applications such as cellular telephones. Lithium batteries are sensitive to excessive voltages. Without a suitable safety circuit overcharging may compromise the batteries reliability. A shunt regulator is often employed to regulate the charging voltage to the lithium battery.

An example shunt regulator charging system for a lithium battery is shown in FIG. 1. As shown in FIG. 1, the shunt regulator charging system includes a power source (PS), a shunt regulator (102), and a lithium battery (BATT). The power source (PS) includes a voltage source (VS) and a source resistance (RS). The shunt regulator (102) includes a NMOS transistor (MN), a PMOS transistor (MP), an amplifier (AMP), and three resistors (R1–R3).

In operation the power source provides a charging current (I) to the lithium battery through source resistance RS, PMOS transistor MP, and resistor R3. Resistor R3 converts the charging current (I) into a voltage (VSNS), which is used by other circuitry (not shown) to control the activation of transistor MP. PMOS transistor MP is activated during normal charging operations. Resistors R1 and R2 form a voltage divider that provide a feedback signal to amplifier AMP. Amplifier AMP compares the feedback signal to a reference voltage (VREF) and provides a control signal to transistor MN. Transistor MN, amplifier AMP, and resistors R1–R2 together operate as a shunt regulator that regulates the input voltage (VIN). The shunt regulator provides safe charging of lithium battery BATT by limiting the charging voltage (input voltage) similar to a zener diode.

SUMMARY OF THE INVENTION

A shunt regulator system includes protection to prevent a battery from overcharging when the shunt regulator is active and a "fault" condition is detected. The system may be implemented in an integrated circuit. A control circuit is used to actuate one or more switches when one or more "fault" conditions are detected. The switches provide a conduction path to shunt current away from the battery such that the battery does not charge beyond a safe level. The control circuit may include a comparator that compares the battery voltage to a predetermined level, which may be adjusted based on various system requirements. The fault condition may result from defects and/or misuse, including: semiconductor processing defects such as a shorted resistor, manufacturing assembly defects such as improperly connected or defective components, utilizing an illegal charger, as well as others. The switches prevent the battery from being overcharged when fault conditions occur.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on". Also, "battery" includes single cell batteries and multiple cell batteries.

Figure 2:
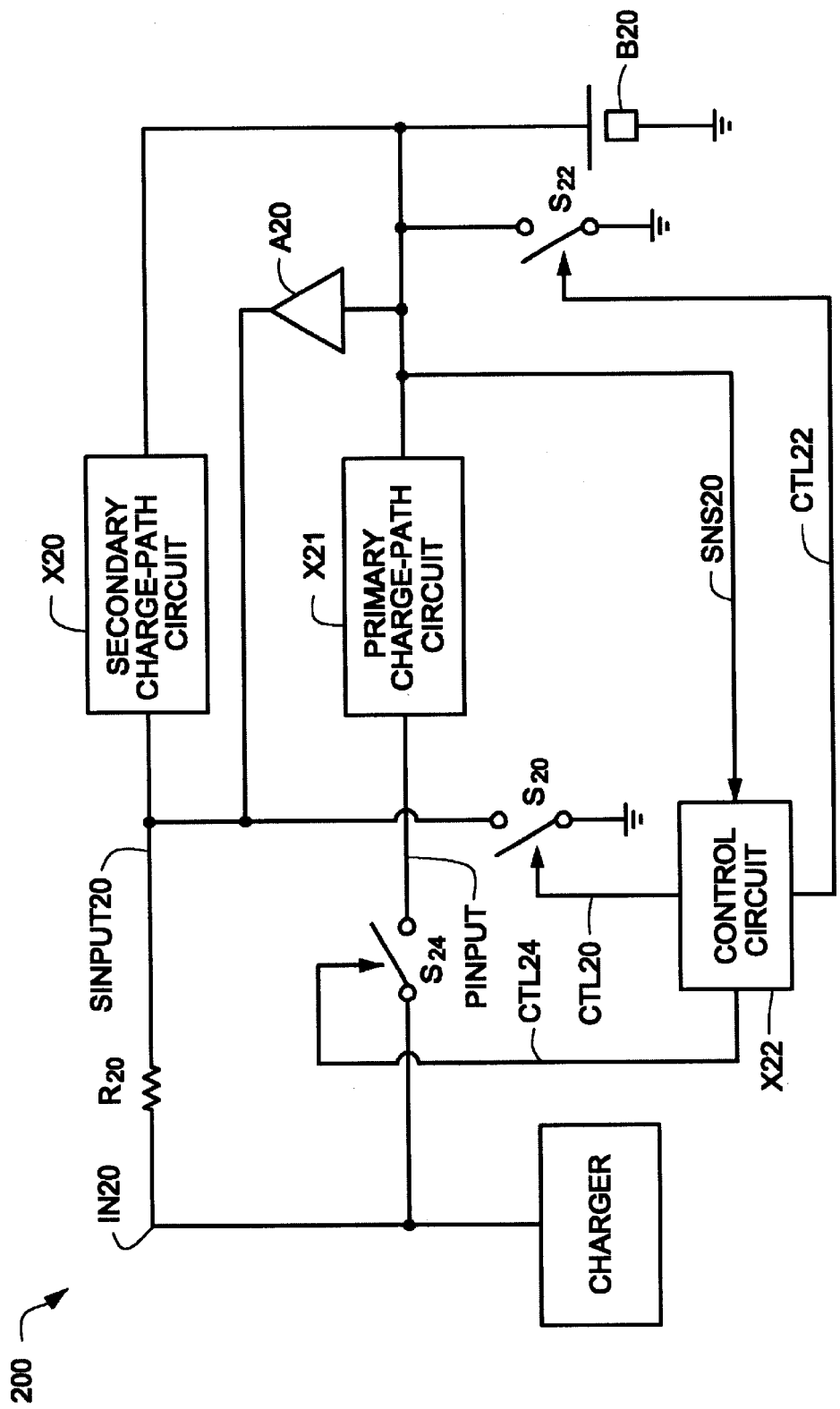
FIG. 2 is a schematic diagram of an exemplary dual-path shunt regulator system.

FIG. 2 is a schematic diagram of an exemplary dual-path shunt regulator system (200) that is arranged in accordance with the present invention. The dual-path shunt regulator system (300) includes a charger, a resistor (R20), three switching circuits (S20, S22, S24), a unity-gain buffer (A20), a secondary charge-path circuit (X20), a primary charge-path circuit (X21), a control circuit (X22), and a battery (B20). The dual-path shunt regulator system (200) may be implemented, in part or whole, as an integrated circuit.

The charger is coupled to node IN20. The resistor (R20) is coupled between node IN20 and node SINPUT20. The secondary charge-path circuit (X20) is coupled between node SINPUT20 and node SNS20. The primary charge-path circuit (X21) is coupled between node PINPUT20 and node SNS20. Switching circuit S24 is coupled between node IN20 and node PINPUT20, and is arranged to actuate in response to control signal CTL24. Unity-gain buffer A20 includes an input that is coupled to node SNS20, and an output that is coupled to node SINPUT20. Switching circuit S20 is coupled between node SINPUT20 and a circuit ground, and is arranged to actuate in response to control signal CTL20. Switching circuit S22 is coupled between node SNS20 and a circuit ground, and is arranged to actuate in response to control signal CTL22. Control circuit X22 is arranged to sense a signal at node SNS20, and provide control signals CTL20, CTL22, and CTL24. Battery B20 is coupled between node SNS20 and the circuit ground.

The charger circuit acts as a power source to provide energy to charge battery B20. In one example, the charger circuit is a conventional charger that operates as a constant current/constant voltage source. In another example, the charger circuit is a conventional power source such as a voltage source, and switching circuit S24 is replaced by a linear regulator circuit. Switching circuit S24 is arranged to selectively couple energy from the charger (at IN20) to the primary input (PINPUT20). Resistor R20 is arranged to couple energy from the charger (at IN20) to the secondary input (SINPUT20). In some systems, resistor R20 and/or switching circuit S24 may be included in the charger.

Dual-path shunt regulator system 200 includes two possible current paths from the charger to battery B20. Switching circuit S24 and charger control circuit X21 provide a primary conduction path from the charger to battery B20, when the system (200) is in a normal charging operating mode. Resistor R20 and secondary charge-path circuit X20 provides a secondary conduction path from the charger to battery B20, when the system (200) is in a low-charge operating mode. Nodes PINPUT20 and SINPUT20 are arranged as input nodes that receive energy from the charger circuit for the primary and secondary conduction paths, respectively.

The normal charging operating mode is employed when battery B20 has a potential that is above a predetermined threshold. A low-charge operating mode is employed when the battery B20 has a potential that is below the predetermined threshold. In one example, the predetermined threshold corresponds to a battery voltage of 2V. A fault condition mode may be employed either when unity-gain buffer A20 fails to operate correctly, or when resistor R20 has a resistance value that is well below a predetermined resistance level.

During the normal charging operating mode, switching circuit S24 is closed by control signal CTL24, and primary charge-path circuit X21 provides a charging current (the primary charging current) to battery cell B20 through a primary conduction path. The primary charge-path circuit X21 is arranged to receive energy from the primary input (PINPUT20), and couple energy to the battery as a charging current (the primary charging current). Primary charge-path circuit X21 may be configured to operate as shunt regulator such as, for example, circuit 102 shown in FIG. 1. Alternatively, the charger circuit may be configured to operate as a constant current/constant voltage source and the primary charge-path circuit X21 is configured to operate as a controlled switch. Unity-gain buffer A20 acts as a buffer (or voltage follower) such that the secondary input node (SINPUT20) has a potential that is substantially the same as the potential of battery cell B20. Secondary charge-path circuit X20 is effectively inactive (the secondary charge-path is not used) when the potential at node SINPUT20 (the secondary input) is substantially the same as the potential of battery cell B20. During this mode (normal charging operating mode), control circuit X22 maintains switches SW20 and SW22 in an open circuit position and switch SW24 in a closed position, using control signals CTL20, CTL22, and CTL24, respectively.

During the low-charge operating mode, the battery (B20) has an associated potential that is below a predetermined threshold. In this operating mode, the primary charge-path circuit (X21) and the unity-gain buffer (A20) are inactive, and switching circuit S24 is opened by control signal CTL24. A secondary charging current is provided to battery cell B20 through a secondary conduction path. The secondary charge-path circuit X20 is arranged to receive energy from the secondary input (SINPUT20), and deliver the energy to the battery as a charging current (the secondary charging current). The secondary conduction path is formed through resistor R20 and secondary charge-path circuit X20, which is active, such that a charging current is provided to the battery even though primary charge-path circuit X21 (i.e., the primary conduction path) is unpredictable. For example, a very low current (i.e., a "trickle current") may be provided to the battery over the secondary conduction path when the voltage associated with the battery is below 2V. After the battery (B20) stores sufficient charge from the secondary charging current, the potential of the battery (B20) is increased above the predetermined threshold and the system (200) transitions into the normal charging operating mode.

A fault mode may occur during charging such that the battery (B20) may be excessively charged. An excessively charged battery may result in a dangerous condition such that the battery may explode (i.e., in a Lithium-Ion battery). System 200 is arranged to prevent excessively charging the battery by providing an addition conduction path to the circuit ground for the charge to be dissipated. System 200 includes two switching circuits (S20 and S22) that are arranged to protect the battery from overcharging. Although system 200 includes two switching circuits, a single one of the switching circuits may be sufficient to protect the battery. Alternatively, multiple switching circuits may be employed to provide a conduction path away from the battery.

In one exemplary fault mode, resistor R20 has an inappropriately low resistance value. In another exemplary fault mode, unity-gain buffer A20 is damaged, inoperable, or otherwise unsuitable for use in the system (200). The potential of the battery (B20) may be monitored to detect a fault mode. Alternatively, the potential of the secondary input (SINPUT20) may be monitored to detect a fault mode.

Unity-gain buffer A20 has a limited ability to sink and source current. The potential of node SINPUT20 may increase dramatically once the current sinking ability of unity-gain buffer A20 is exceeded. A high potential at node SINPUT20 may result in excess current that is provided to the battery (B20) through the secondary charge-path circuit. Switching circuit S20 is actuated when a fault mode is detected to protect the battery (B20) from excessive charging current (overcharging). Switching circuit S22 may be used to further protect the battery (B20) from excessive charge.

A switch, i.e. switching circuit S20, may be coupled to node SINPUT20 to provide a conduction path that shunts current away from the battery (B20). Additional switches may be employed either coupled to node SINPUT20, or coupled to the battery (B20) to provide additional protection to the battery. For example, switch S20 may be an array of redundant switching circuits that are coupled to node SINPUT20 such that at least one of the switching circuits will be operable when other switching circuits may be inoperable (i.e., due to a failure). Switching circuit S22 in FIG. 2 is an optional switch that may be employed to provide a conduction path away from the battery for stray currents such as, for example, leakage currents. Switching circuit S22 may also be an array of redundant switching circuits that are coupled to node SNS20 such that at least one of the switching circuits will be operable when other switching circuits may be inoperable (i.e., due to a failure).

Control circuit X22 is arranged to detect a fault mode and actuate switches S20 and S22 via control signals CTL20 and CTL22, respectively. The fault mode may be detected by monitoring the potential of the battery (B20) at node SNS20. In one example a voltage comparator circuit is utilized to compare the potential of SNS20 to a safety limit for the battery. For example, a safety limit of 4.4V may be utilized for a Lithium-Ion battery cell such that switches S20 and S22 are actuated when the battery potential exceeds 4.4V. The safety limit may be increased to ensure that the maximum potential of the battery (B20) is not exceeded by a predetermined safety margin level.

In an alternative embodiment, switching circuits S20 and S22 are replaced by another switching circuit (not shown) that is connected in series between resistor R20 and secondary charge-path circuit X20. In this alternative embodiment, the switching circuit is open during the fault mode, and closed during the other modes. The conduction path through the secondary input (SINPUT20) to the battery (B20) is broken by opening the switching circuit.

Figure 3:
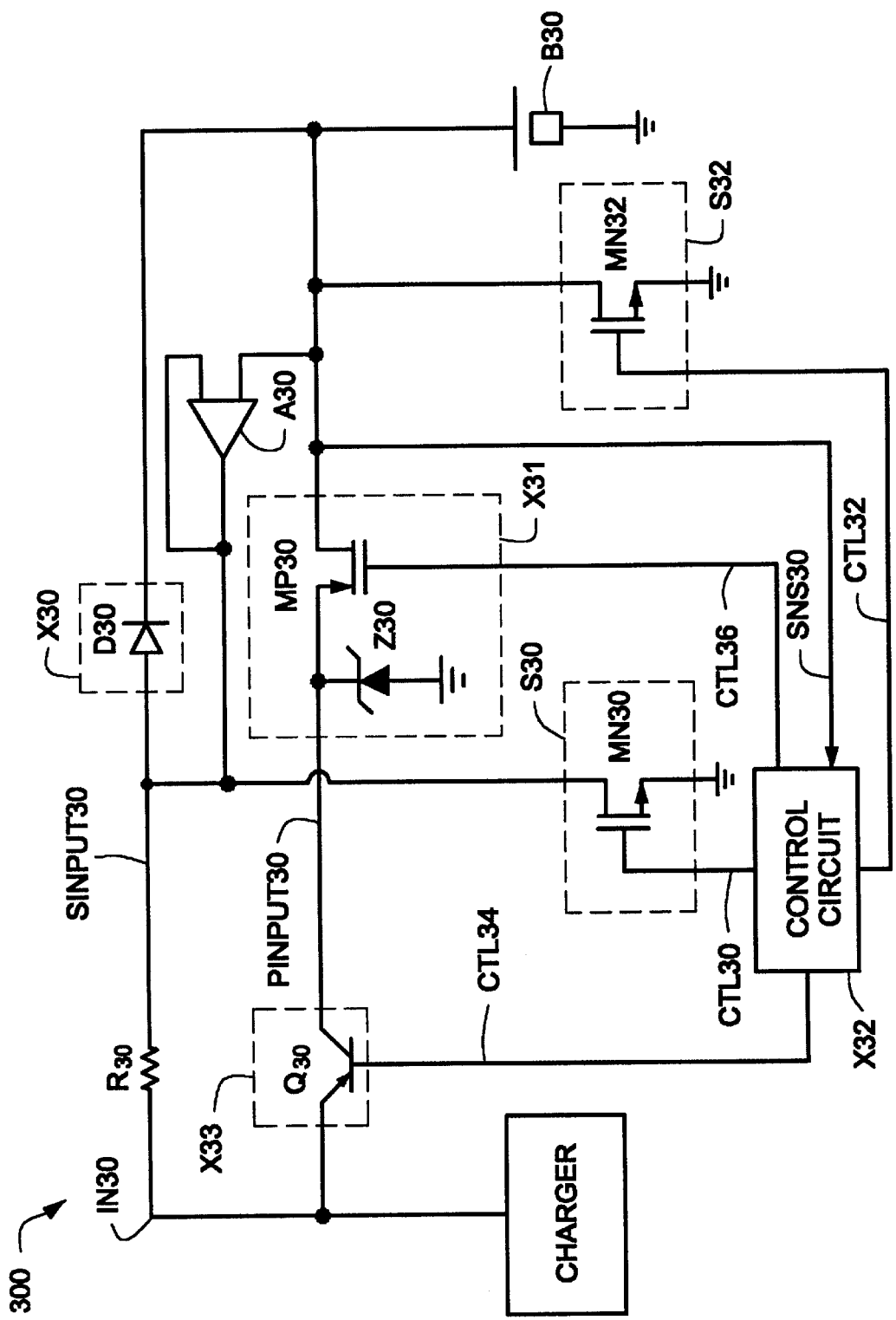
FIG. 3 is a schematic diagram of another exemplary dual-path shunt regulator system, in accordance with the present invention.

FIG. 3 is a schematic diagram of another exemplary dual-path shunt regulator system (300) that is arranged in accordance with the present invention. The dual-path shunt regulator system (300) includes a charger, a resistor (R30), two switching circuits (S30, S32), a switching/regulation circuit (X33), an amplifier (A30), a secondary charge-path circuit (X30), a primary charge-path circuit (X31), a control circuit (X32), and a battery (B30). The dual-path shunt regulator system (300) may be implemented, in part or whole, as an integrated circuit.

The charger is coupled to node IN30. The resistor (R30) is coupled between node IN30 and node SINPUT30. The secondary charge-path circuit (X30) is coupled between node SINPUT30 and node SNS30. The primary charge-path circuit (X31) is coupled between node PINPUT30 and node SNS30. Switching/regulation circuit X33 is coupled between node IN30 and node PINPUT30, and is arranged to actuate in response to control signal CTL34. Amplifier A30 includes an input that is coupled to node SNS30, a second input that is coupled to node SINPUT30, and an output that is coupled to node SINPUT30. Switching circuit S30 is coupled between node SINPUT30 and a circuit ground, and is arranged to actuate in response to control signal CTL30. Switching circuit S32 is coupled between node SNS30 and a circuit ground, and is arranged to actuate in response to control signal CTL32. Control circuit X32 is arranged to sense a signal at node SNS30, and provide control signals CTL30, CTL32, CTL34, and CTL36. Battery B30 is coupled between node SNS30 and the circuit ground.

The system illustrated in FIG. 3 is substantially similar to that shown in FIG. 2, and like circuits are labeled similarly.

Switching circuits S30 and S32 include N-type field effect transistors (FETs) MN30 and MN32, respectively. The field effect transistors (MN30, MN32) may be arranged to operate as switches similar to that described with respect to switches S20 and S22 described with reference to FIG. 2.

Switching/regulation circuit X33 includes a PNP-type bipolar junction transistor (BJT Q30). Switching/regulation circuit X33 may be arranged to operate as a switching circuit similar to switching circuit S24 described with respect to FIG. 2. Alternatively, switching/regulation circuit X33 may be arranged to operate as a linear regulator when the charger is a power source.

Secondary charge-path circuit X30 includes a diode circuit D30. Diode circuit D30 will conduct when forward biased (active). Diode circuit D30 is forward biased (active) when the potential at node SINPUT30 exceeds the potential at node SNS30 by a predetermined amount. The predetermined amount is related to the threshold voltage of the diode circuit (D30). The diode circuit may include a diode-connected bipolar junction transistor (BJT), a diode-connected field-effect device (FET), or another circuit that is arranged to operate as a diode. Diode circuit D30 operates substantially similar to the secondary charge-path circuit (X20) described with reference to FIG. 2.

Figure 1:
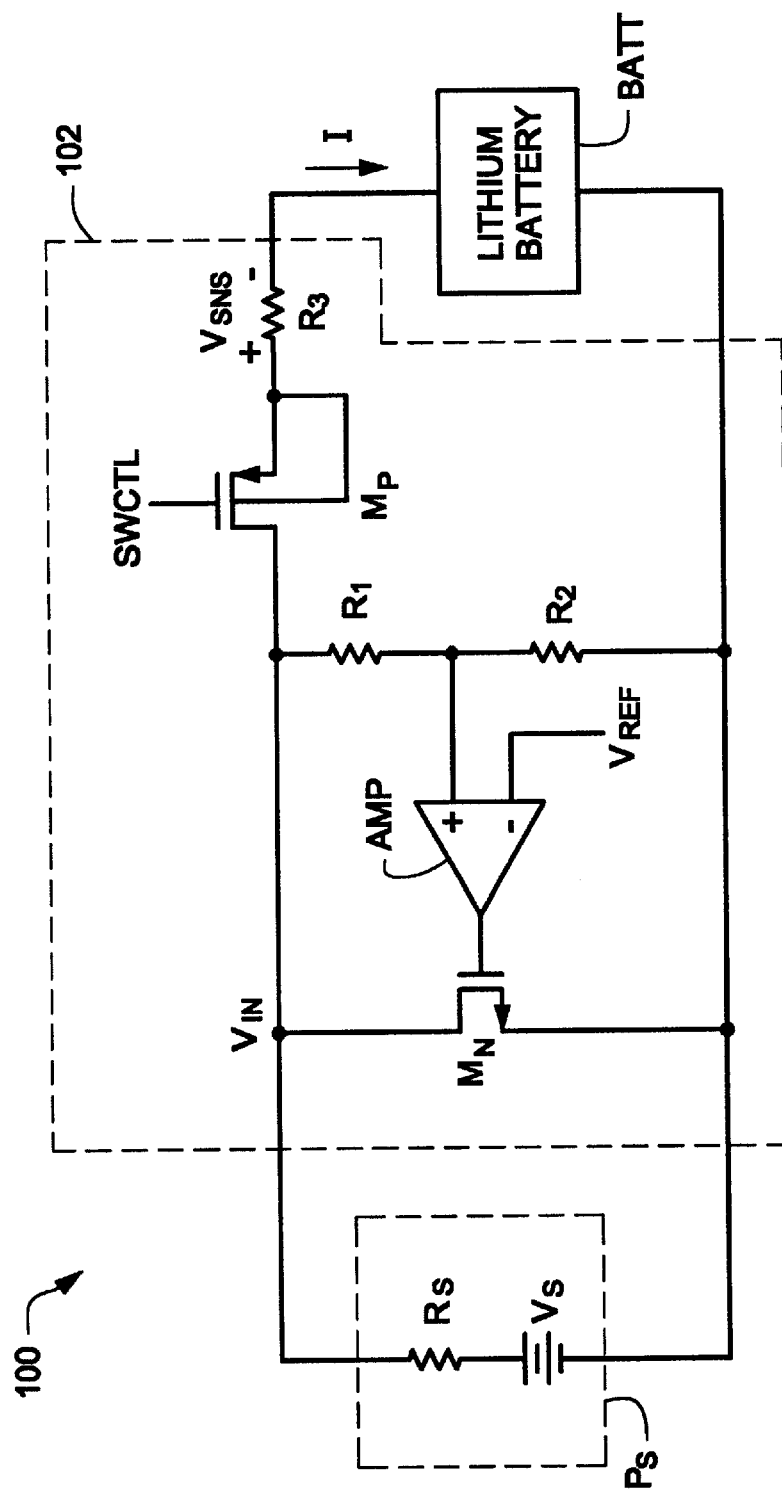
FIG. 1 is a schematic diagram of a conventional lithium battery charging system.

Primary charge-path circuit X31 includes a P-type FET (MP30) and an optional zener circuit Z30. Transistor MP30 is actuated in response to control signal CTL36. Transistor MP30 (and optional zener circuit Z30) is arranged to operate as a primary charge-path circuit as described above with respect to FIG. 2. In operation, primary charge-path circuit X31 is arranged to limit charge that is provided to the battery (B30). Optional zener circuit Z30 may be simple zener diode circuit that is arranged to operate as a shunt regulator. Alternatively, optional zener circuit Z30 may be a shunt regulator type of circuit such as shunt regulator 102, which is illustrated in FIG. 1.

In an alternative embodiment, primary charge-path circuit X31 is arranged to operate as a switching circuit that couples power from the primary input (PINPUT30) to the battery (B30) when actuated. In this embodiment, the charger may be arranged to operate as a constant current and constant voltage source such that the overall system (300) provides adequate regulation of the primary charging current to charge the battery (B30).

Switching circuit S30 is sized according to the desired safety voltage for the battery and the charger that is required by the system. For example, a 30V charger may be used with a Lithium-Ion battery that has a safety limit of 4.4V. A secondary charge-path circuit with a forward voltage drop of 300 mV yields a voltage limit for node SINPUT30 of 4.7V. A maximum current through switching circuit S30 is 940 mA when the switch on-resistance is 5 ohms. (4.7V/5). Resistor R4 must be greater than (30V−4.7V)/0.94, or 27 ohms, to protect the battery.

Switching circuits S30 and S32 may each include a multiplicity of switching circuits that are effectively connected in parallel with one another. The parallel-connected switching circuits are arranged to provide a redundancy in the system such that the protection circuits will operate even though one of the particular switching circuits may fail.

The protection circuits described above with reference to FIGS. 2 and 3 are arranged to provide a conduction path to shunt current away from the battery. An overcharged battery may become damaged or hazardous depending on the type of battery material. For example, a Lithium-Ion battery may explode when charged beyond a safe level. Other types of batteries also have a maximum charge safety level that should not be exceeded. The control circuit circuits are arranged to monitor (or sense) the battery voltage to determine when the battery charge level is approaching an unsafe condition. The control circuit may employ a comparator circuit to compare the battery voltage to a predetermined level that is related to the safety level. The comparison may be implemented as an analog circuit and/or a digital electronic circuit that is arranged to sense the battery voltage. The control circuit is also arranged to actuate one or more switches (i.e., switching circuits S20, S22, and S24) when one or more "fault" conditions are detected. The switches provide a conduction path to shunt current away from the battery such that the battery does not charge beyond a safe level.

Fault conditions in the charger systems depicted in FIGS. 2 and 3 may result from semiconductor processing defects, manufacturing defects, mechanical stress, thermal stress, misuse, as well as others. For example, a shorted resistor or an improper resistance value may be the result of a semiconductor processing defect, a manufacturing defect, or some other condition. The shorted resistor would potentially result in excessive charging currents to the battery. FIGS. 2 and 3 are arranged to prevent the battery from being overcharged when one or more fault conditions occur.

A compliant charger is often required for proper charging operation in a charger system (i.e., voltage and current source characteristics that are within the design constraints of the charger system). A non-compliant charger corresponds to a charger that has a voltage and/or current characteristic that exceeds the design criteria for the charger system. The use of a non-compliant charger in a charger system may result in an overcharged cell. FIGS. 2 and 3 are arranged to prevent the battery from being overcharged by detecting a fault conditon uses a non-compliant charger is used.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for protecting a battery that is charged by a charger, comprising:
   a primary input that is arranged to selectively receive energy from the charger;
   a secondary input that is arranged to receive energy from the charger;
   a primary charge-path circuit that is arranged to selectively couple power from the primary input to the battery when the voltage associated with the battery is above a predetermined amount, such that the battery is selectively charged by a primary charging current;
   a secondary charge-path circuit that is arranged to selectively couple power from the secondary input to the battery when the voltage associated with the battery is below the predetermined amount, such that the battery is selectively charged by a secondary charging current; and
   at least one switching circuit that is arranged to selectively disable the secondary charging current when a fault condition is detected such that the battery is protected from overcharging.

2. An apparatus as in claim 1, wherein the at least one switching circuit is arranged to disable the secondary charging current by shunting current away from the secondary input when a fault condition is detected such that the power at the secondary input is diverted away from the battery to prevent overcharging the battery.

3. An apparatus as in claim 1, wherein the at least one switching circuit selectively shunts current to a circuit ground when the fault condition is detected.

4. An apparatus as in claim 1, wherein the secondary charge-path circuit is arranged to operate as a diode circuit such that the secondary charge-path circuit provides the secondary charging current to the battery when the diode circuit is forward biased.

5. An apparatus as in claim 4, wherein the diode circuit includes at least one of a diode device, a bipolar junction transistor (BJT) that is configured to operate as a diode, and a field effect transistor (FET) that is configured to operate as a diode.

6. An apparatus as in claim 1, wherein the secondary charge-path circuit is arranged to operate as a switch such that the secondary charge-path circuit provides the secondary charging current when the switch is activated, and the secondary charging circuit disables the charging current when the switch is deactivated.

7. An apparatus as in claim 1, wherein the primary charge-path circuit is arranged to operate as a primary charge path when coupled to the charger, and the primary charge-path circuit provides the primary charging current to the battery when the voltage associated with the battery is above the predetermined amount.

8. An apparatus as in claim 1, further comprising an amplifier circuit that is coupled between the battery and the secondary input.

9. An apparatus as in claim 8, wherein the amplifier circuit is arranged to operate as a buffer to sink current from the charger and prevent the secondary charge-path circuit from activating when the primary charge-path circuit is operating.

10. An apparatus as in claim 8, wherein the amplifier has a current sink limit that is exceeded when the fault condition is detected.

11. An apparatus as in claim 1, further comprising a normal charging operating mode, a low-cell operating mode, and a fault mode, wherein the primary charge-path circuit operates as a regulator during a normal charging operating mode, the secondary charge-path circuit provides the secondary charge path to the battery during the low-cell operating mode, and the at least one switching circuit is activated in the fault mode.

12. An apparatus as in claim 11, wherein the low-cell operating mode is activated when the voltage associated with the battery is below a predetermined amount, the normal charging operating mode is activated when the voltage associated with the battery is above the predetermined amount, and the fault mode is activated when the voltage associated with the battery exceeds a predetermined safety limit.

13. An apparatus as in claim 1, wherein the fault condition is caused by at least one of a thermal stress, a mechanical stress, a manufacturing assembly defect, a semiconductor processing defect, and a non-compliant charger.

14. An apparatus as in claim 1, further comprising a resistance circuit that is coupled between the charger and the secondary input.

15. An apparatus as in claim 14, wherein the fault condition is detected when the resistance circuit has a resistance value that is below a predetermined value.

16. An apparatus as in claim 14, the at least one switching circuit further comprising at least one transistor circuit that is coupled to the secondary input such that the at least one transistor couples energy away from the secondary input when active.

17. An apparatus as in claim 14, the at least one switching circuit further comprising at least one transistor circuit that is coupled to the battery such that the at least one transistor couples energy away from the battery when active.

18. An apparatus as in claim 14, the at least one switching circuit further comprising at least a first transistor circuit that is coupled to the secondary input and arranged to couple energy away from the secondary input when active, and at least a second transistor circuit that is coupled to the battery and arranged to couple energy away from the battery when active.

19. An apparatus as in claim 18, wherein the at least a first and second transistor circuits are actuated when the voltage associated with the battery is above a predetermined amount such that current from the charger is shunted away from the battery through the at least a first transistor, and stray currents are shunted away from the battery through the at least a second transistor to prevent the battery from overcharging.

20. A method of protecting a battery that is being charged by a charger, comprising:
   monitoring a voltage associated with the battery to provide a sense voltage;
   coupling the charger to a primary input when a primary conduction path is enabled, such that the battery is charged by a primary charging current that is delivered to the battery over the primary conduction path when the sense voltage is above a first predetermined amount;

coupling the charger to a secondary input;

coupling energy from the secondary input to the battery when a secondary conduction path is enabled, such that the battery is charged by a secondary charging current that is delivered to the battery over the secondary conduction path when the sense voltage is below the first predetermined amount;

detecting an over-voltage condition in the battery when the sense voltage exceeds a second predetermined level;

activating a fault mode when the over-voltage condition is detected; and shunting current away from the secondary input when the fault mode is active such that the secondary current path to the battery is disabled.

21. An apparatus for protecting a battery that is being charged by a charger, comprising:

a primary input that is arranged to selectively receive energy from the charger;

a secondary input that is arranged to receive energy from the charger;

a first means for coupling that is arranged to couple the charger to the primary input when a primary conduction path is enabled;

a second means for coupling that is arranged to couple the charger to a secondary input;

a means for coupling energy that is arranged to couple energy from the secondary input to the battery when a secondary conduction path is enabled;

a means for monitoring that is arranged to monitor a voltage that is associated with the battery to provide a sense voltage;

a means for comparing that is arranged to compare the sense voltage to a predetermined level such that an over-voltage condition in the battery is detected when the sense voltage exceeds the predetermined level; and a means for shunting that is arranged to shunt current away from the secondary input when the over-voltage condition is detected such that the secondary current path to the battery is disabled.

22. An apparatus as in claim 21, further comprising a second means for shunting that is arranged to shunt stray currents away from the battery when the over-voltage condition is detected.

* * * * *